United States Patent [19]

De Doncker et al.

[11] Patent Number: 5,355,294
[45] Date of Patent: Oct. 11, 1994

[54] UNITY POWER FACTOR CONTROL FOR DUAL ACTIVE BRIDGE CONVERTER

[75] Inventors: Rik W. A. A. De Doncker; Mustansir H. Kheraluwala, both of Schenectady, N.Y.

[73] Assignee: General Electric Company, Schenectady, N.Y.

[21] Appl. No.: 981,670

[22] Filed: Nov. 25, 1992

[51] Int. Cl.$^5$ .............................................. H02M 3/335
[52] U.S. Cl. ........................................ 363/17; 363/129; 323/207
[58] Field of Search ................ 363/16, 17, 34, 27, 363/28, 127, 128, 129; 323/207

[56] References Cited

U.S. PATENT DOCUMENTS 5,027,264  6/1991  De Doncker et al. ............... 363/16
5,224,025  6/1993  Divan et al. ...................... 363/34 X Primary Examiner—Emanuel T. Voeltz
Attorney, Agent, or Firm—Jill M. Breedlove; Marvin Snyder

[57] ABSTRACT

A dual active bridge converter, including high-frequency transformer-coupled input and output bridge converters, receives a rectified ac line voltage via a rectifier acting in a resistive mode and a small, high-frequency filter capacitor. A phase angle controller controls a phase shift between the voltages across the transformer windings such that high-efficiency dc-to-dc conversion is achieved, while maintaining unity power factor at the ac input, using high-density circuitry with small filter components and without adding additional front-end power factor correction circuitry.

4 Claims, 6 Drawing Sheets

UNITY POWER FACTOR CONTROL FOR DUAL ACTIVE BRIDGE CONVERTER

FIELD OF THE INVENTION

The present invention relates generally to power converters and, more particularly, to a dual active bridge converter controlled to operate at unity power factor and high efficiency.

BACKGROUND OF THE INVENTION

In order to comply with expected future regulations on low and high frequency distortions of main ac power lines and electromagnetic interference requirements, it is necessary to improve waveform quality of ac-to-dc converters. In general, there are two approaches to solving this problem. The first approach entails increasing size and reactance value of passive filter elements, i.e. inductors and capacitors, in order to reduce the h frequency content of the ac input waveforms. Disadvantageously, this approach becomes increasingly expensive at higher power levels and creates other side effects for which compensation must be provided, such as high in-rush currents, low range of stability and poor power factor. The second approach entails increasing the switching frequency of the converter waveforms such that filter size can be reduced, since filter size is inversely proportional to the frequency content of the filtered waveform. The disadvantage of this second approach resides in the need for additional active power devices and control circuitry.

Accordingly, it is desirable to provide a converter controlled to provide unity power factor over a wide range of operating conditions, with a minimal number of active devices, while achieving high efficiency and high power density at relatively low cost.

SUMMARY OF THE INVENTION

A dual active bridge converter (DABC), comprising high-frequency transformer-coupled input and output bridge converters, receives a rectified ac line voltage via a rectifier acting in a resistive mode and a small, high-frequency filter capacitor. A phase angle control means controls a phase shift between the voltages across the transformer windings such that high-efficiency dc-to-dc conversion is achieved, while maintaining unity power factor at the ac input, using high-density circuitry with small filter components and without adding additional front-end power factor correction circuitry.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
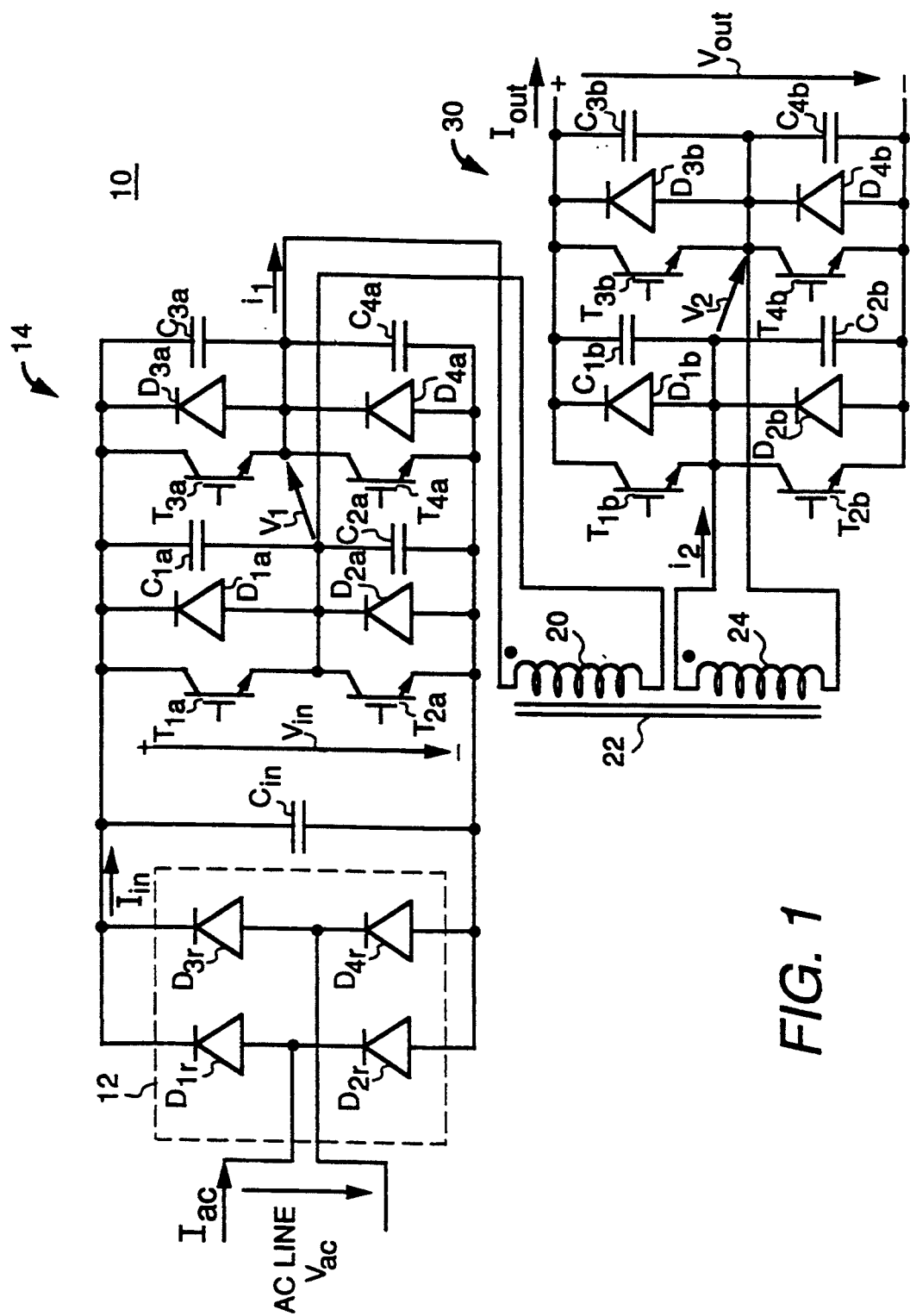
FIG. 1 schematically illustrates a dual active bridge dc-to-dc converter in accordance with the present invention.

FIG. 1 illustrates a dual active bridge dc-to-dc converter 10 coupled to an ac line voltage $V_{ac}$ via a rectifier 12. An exemplary dual active bridge dc-to-dc converter is described in U.S. Pat. No. 5,027,264 of De Doncker et al., issued Jun. 25, 1991 and incorporated by reference herein. Rectifier 12 is shown in FIG. 1 as comprising diodes $D_{1r}$–$D_{4r}$ connected in a full-bridge configuration. A small dc bus capacitor $C_{in}$ is coupled across rectifier bridge 12 to provide a high-frequency filtered input dc voltage $V_{in}$, pulsating at twice the ac line frequency, e.g., 120 Hz, to an input bridge converter 14. Input bridge converter 14 comprises four switching devices $T_{1a}$–$T_{4a}$ connected in a full-bridge configuration with a diode $D_{1a}$–$D_{4a}$, respectively, coupled in antiparallel with the corresponding switching device. A capacitor $C_{1a}$–$C_{4a}$, respectively, is coupled in parallel with each switching device $T_{1a}$–$T_{4a}$, respectively, for limiting the rate of rise of voltage during turn-off of the respective switching device, thereby achieving zero-voltage soft-switching at turn-off.

The output voltage $V_1$ of the input bridge converter 14, taken between the junctions joining the switching devices of each phase leg, is provided to the primary winding 20 of a transformer 22. The secondary winding 24 of transformer 20 provides an ac output voltage $V_2$ to an output bridge converter 30. Output bridge converter 30 comprises switching devices $T_{1b}$–$T_{4b}$ connected in a full-bridge configuration in the same manner as input bridge converter 14 with antiparallel diodes $D_{1b}$–$D_{4b}$ and parallel capacitors $C_{1b}$–$C_{4b}$. Output bridge converter 30 provides a dc voltage $V_{out}$ across its output terminals, as shown.

U.S. Pat. No. 5,027,264, cited hereinabove, describes controlling the input and output bridges 14 and 30, respectively, by controlling the respective switching devices to generate "edge resonant" square waves $V_1$ and $V_2$ which are phase shifted with respect to each other. In the dual active bridge converter described in U.S. Pat. No. 5,027,264, a constant input dc voltage is assumed, as realized by a large input capacitor $C_{in}$.

In accordance with the present invention, a dual active bridge converter with an input diode rectifier, such as that of FIG. 1, is controlled directly to operate at unity power factor, without requiring additional power factor correction circuitry. In particular, with input rectifier 12 being used in a resistive mode in conjunction with small, high-frequency filter capacitor $C_{in}$, the phase angle between the voltages $V_1$ and $V_2$ across transformer windings 20 and 24, respectively, is controlled so as to maintain a regulated output dc voltage while realizing near unity power factor and achieving high efficiency. Furthermore, in the dual active bridge converter of FIG. 1, the only large capacitor required is the output capacitor which filters the 120 Hz ripple (twice the ac input frequency) of the input rectifier. However, the output capacitor is usually already large because it is designed to handle the load current ripple and, in many cases, provides energy storage for ride-through capability in case of an ac power voltage dip.

Figure 2:
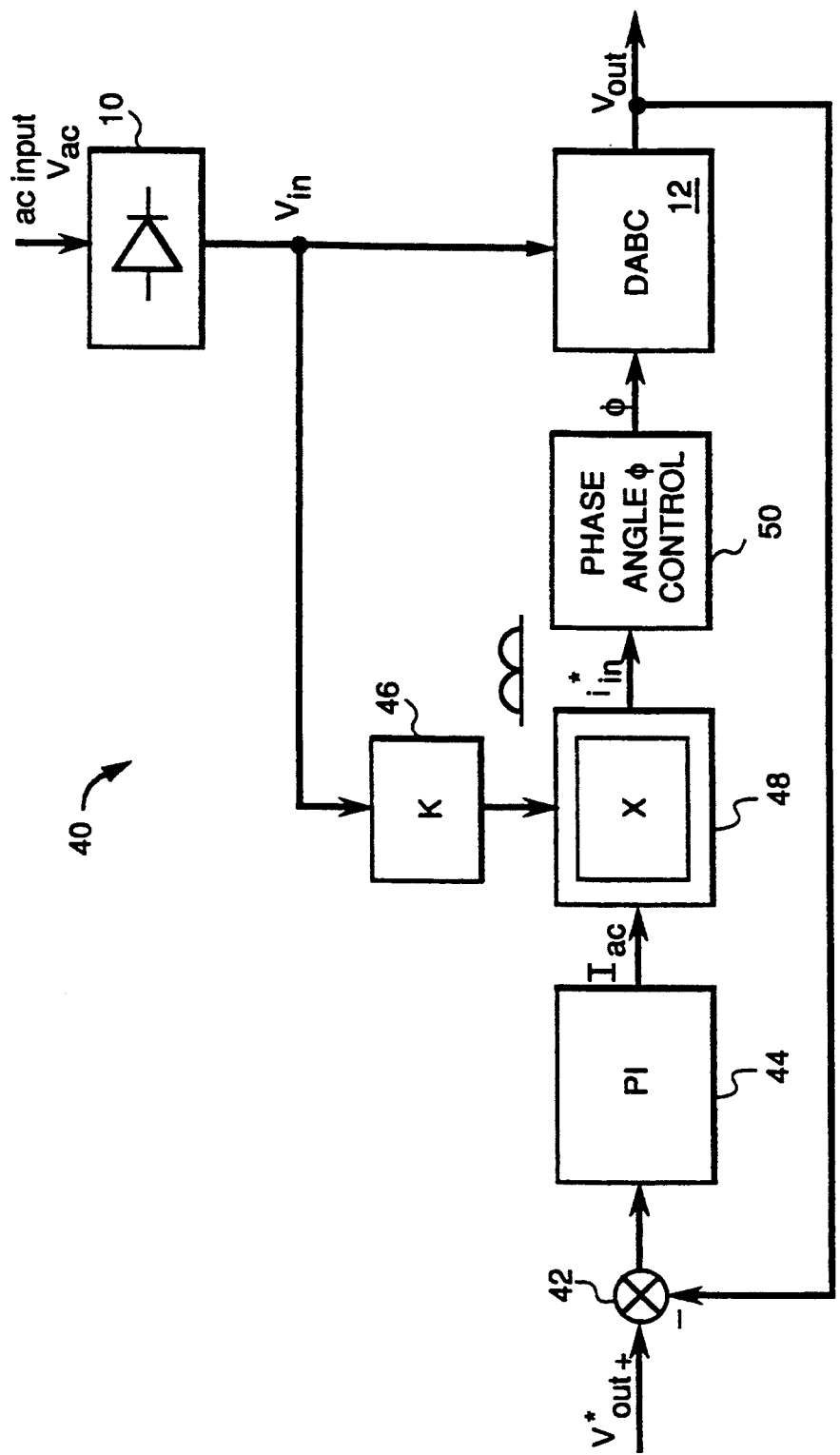
FIG. 2 is a block diagram of a control circuit for controlling the dual active bridge converter of FIG. 1 to achieve unity power factor.

FIG. 2 illustrates a control 40 according to the present invention for controlling the dual active bridge converter of FIG. 1 to operate at unity power factor. The output dc voltage $V_{out}$ is compared in a summer 42 to a commanded output voltage $V_{out}^*$, and the resulting signal is provided to a proportional-integral compensator 44 of well-known type for generating a current signal $I_{ac}$ proportional to the desired magnitude of the ac line current. The rectified ac line voltage $V_{in}$, via a multiplier 46 having multiplicative factor K, modulates the ac current signal $I_{ac}$ in multiplier 48 to provide an ac line current command $i_{in}^*$. The ac current command $i_{in}^*$ is provided to a phase angle control block 50 for controlling the phase angle between voltages $V_1$ and $V_2$ to maintain unity power factor, as described in detail hereinbelow. A phase angle signal $\phi$ from phase angle control block 50 is provided to dual active bridge converter (DABC) 12 for controlling the phase shift between converter bridge voltages $V_1$ and $V_2$ in order to regulate the output voltage $V_{out}$, while maintaining unity power factor.

Equations for the average input current to the dual active bridge converter 10 such that the average input current $I_{in}$ changes sinusoidally are derived as:

$$I_{in} = I_{out} \cdot d = d \frac{V_{in}}{X_L} \phi \left[ 1 - \frac{\phi}{\pi} \right] = \frac{V_{out}}{X_L} \phi \left[ 1 - \frac{\phi}{\pi} \right],$$

where $I_{out}$ represents the average output dc current, and d represents the ratio of the output voltage $V_{out}$ to the input voltage $V_{in}$, as referred to the primary side of the transformer, and $V_{in} = V_p |\sin \omega|$. To realize unity power factor input operation, the input current should be sinusoidal, i.e., $$I_{in} = I_p |\sin \omega|;$$

where $I_p$ is the desired peak of the ac line current, t represents time, and $\omega$ represents the ac line frequency in radians per second of time t. Referring to FIG. 2, $$I_p = K V_p I_{ac},$$

where $V_p$ is the magnitude of the ac line voltage, K is the attenuation factor (block 46), and $I_{ac}$ is the compensated error from the output voltage loop.

Combining the above equations yields a control equation for phase angle control block 50:

$$\phi \left[ 1 - \frac{\phi}{\pi} \right] = \frac{I_p X_L}{V_{out}} |\sin \omega t|, \text{ where } 0 \leq \omega t \leq \frac{\pi}{2},$$

for maintaining a substantially constant output voltage and unity power factor. However, the dual active bridge soft-switching boundaries may limit control over the angle $\phi$.

The operating boundary of the input bridge is given by:

$$d \leq \frac{1}{1 - \frac{2\phi}{\pi}},$$

with $$d = \frac{V_{out}}{V_p |\sin \omega t|},$$

which means that a minimum angle value $\phi_{min}$ should be $$\phi_{min} \geq \frac{\pi}{2} \left( 1 - \frac{V_p |\sin \omega t|}{V_{out}} \right)$$

The operating boundary of the output bridge is given by:

$$d \geq 1 - \frac{2\phi}{\pi},$$

with $$\phi_{min} \geq \frac{\pi}{2} \left( 1 - \frac{V_{out}}{V_p |\sin \omega t|} \right).$$

These boundaries define the unity power factor operating range for the dual active bridge converter in accordance with the present invention. Whenever $\phi$ is required to be smaller than $\phi_{min}$, $\phi$ will follow the boundary line $\phi_{min}$, and the input current will not follow the sinusoidal reference, leading to greater distortion.

Figure 3:
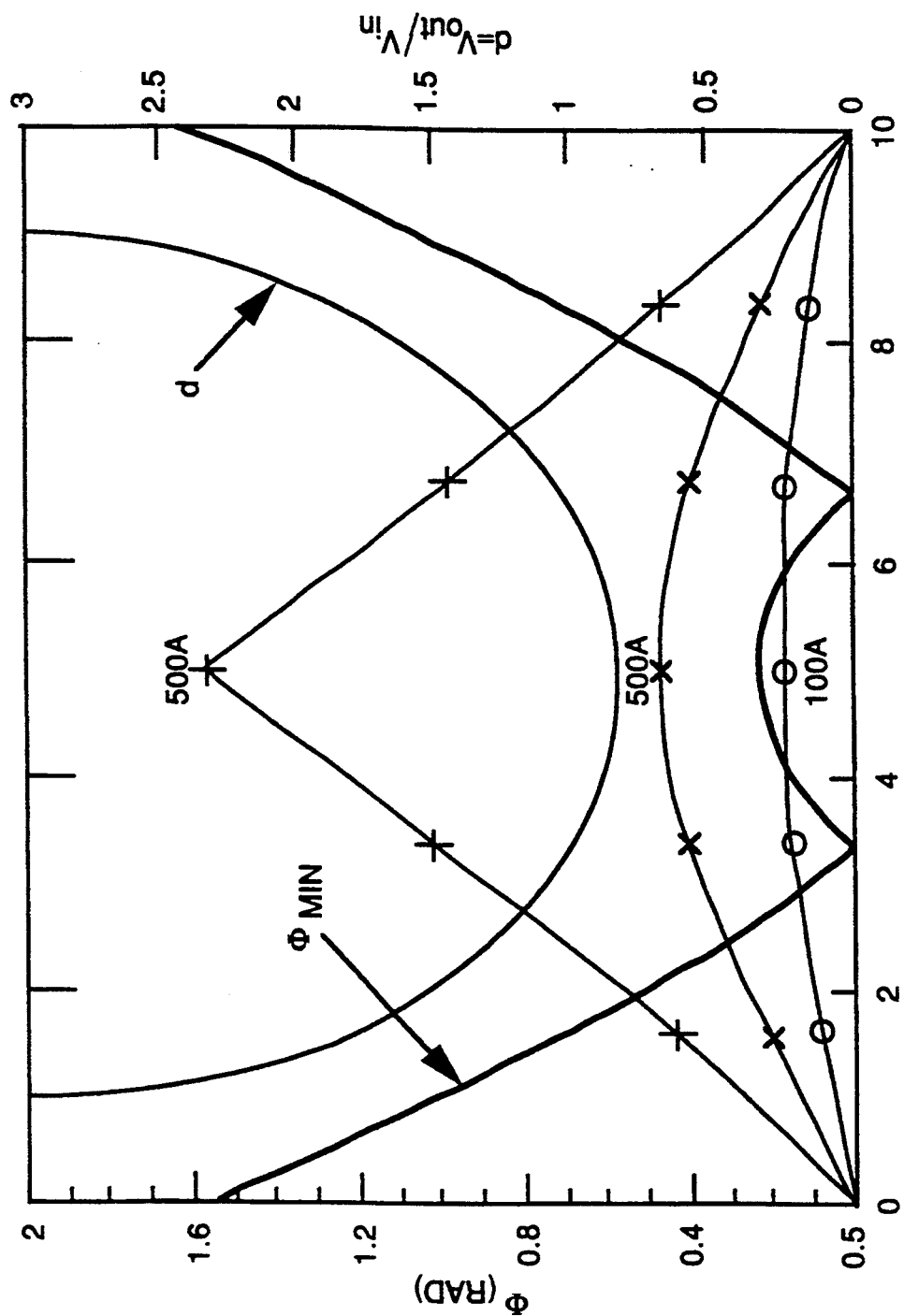
FIG. 3 graphically illustrates variation of the control angle over one-half cycle of the input current for a dual active bridge converter in accordance with the present invention.

FIG. 3 illustrates the variation of the control angle $\phi$ over one-half cycle of the input current for different amplitudes thereof. The minimum angle $\phi_{min}$ is also shown. Unity power factor control is possible whenever $\phi > \phi_{min}$.

Figure 4:
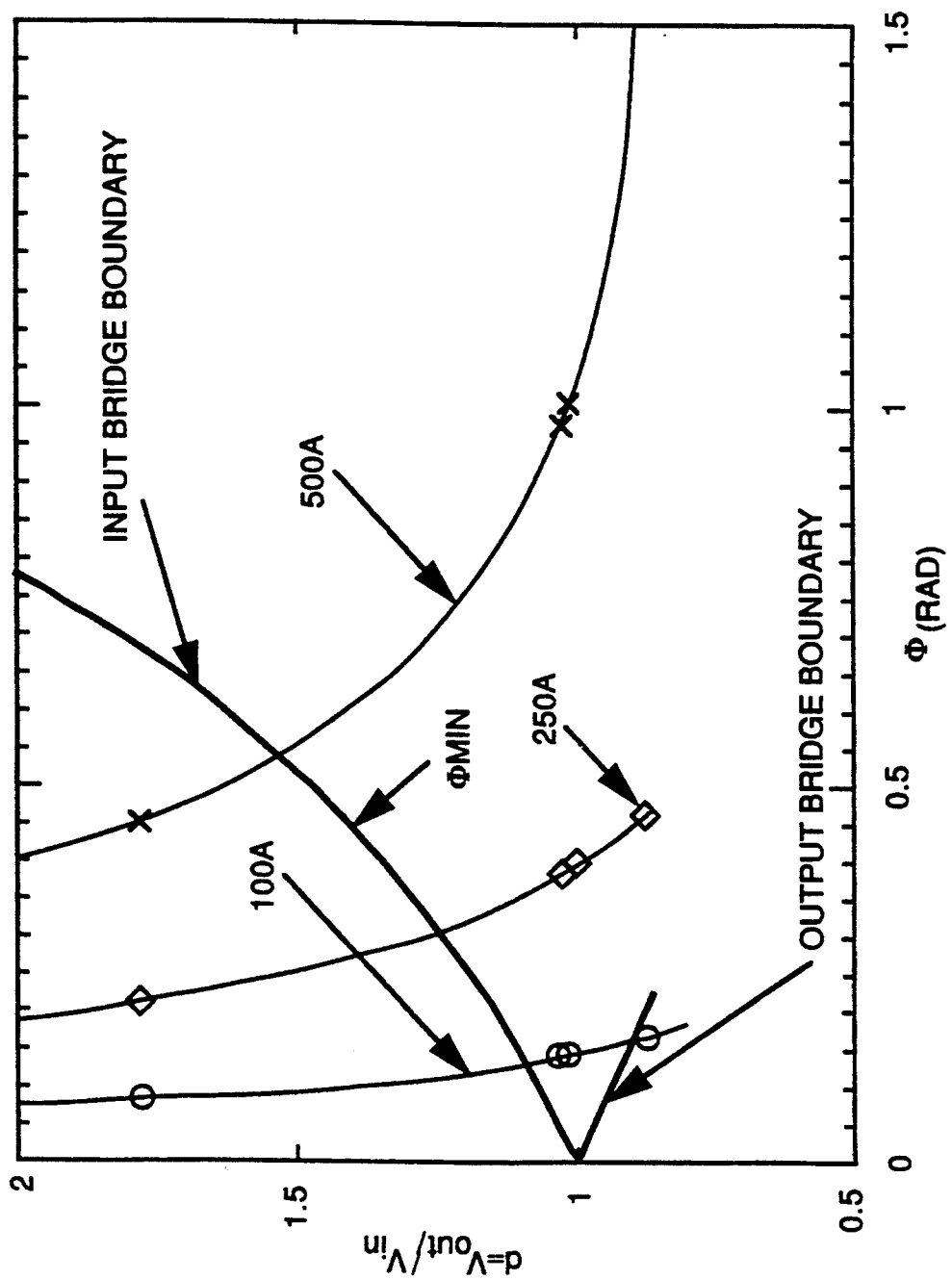
FIG. 4 graphically illustrates the angle control function in the d-$\phi$ plane for a dual active bridge converter in accordance with the present invention.

Clearly, unity power factor control (with low distortion) can be achieved at high load current over almost the entire cycle of the fundamental input wave. At low input currents, however, the currents will be distorted. FIG. 4 illustrates the control function of $\phi$ and the soft-switching boundaries in the d-$\phi$ plane. The input bridge and output bridge boundaries are also shown.

Figure 5:
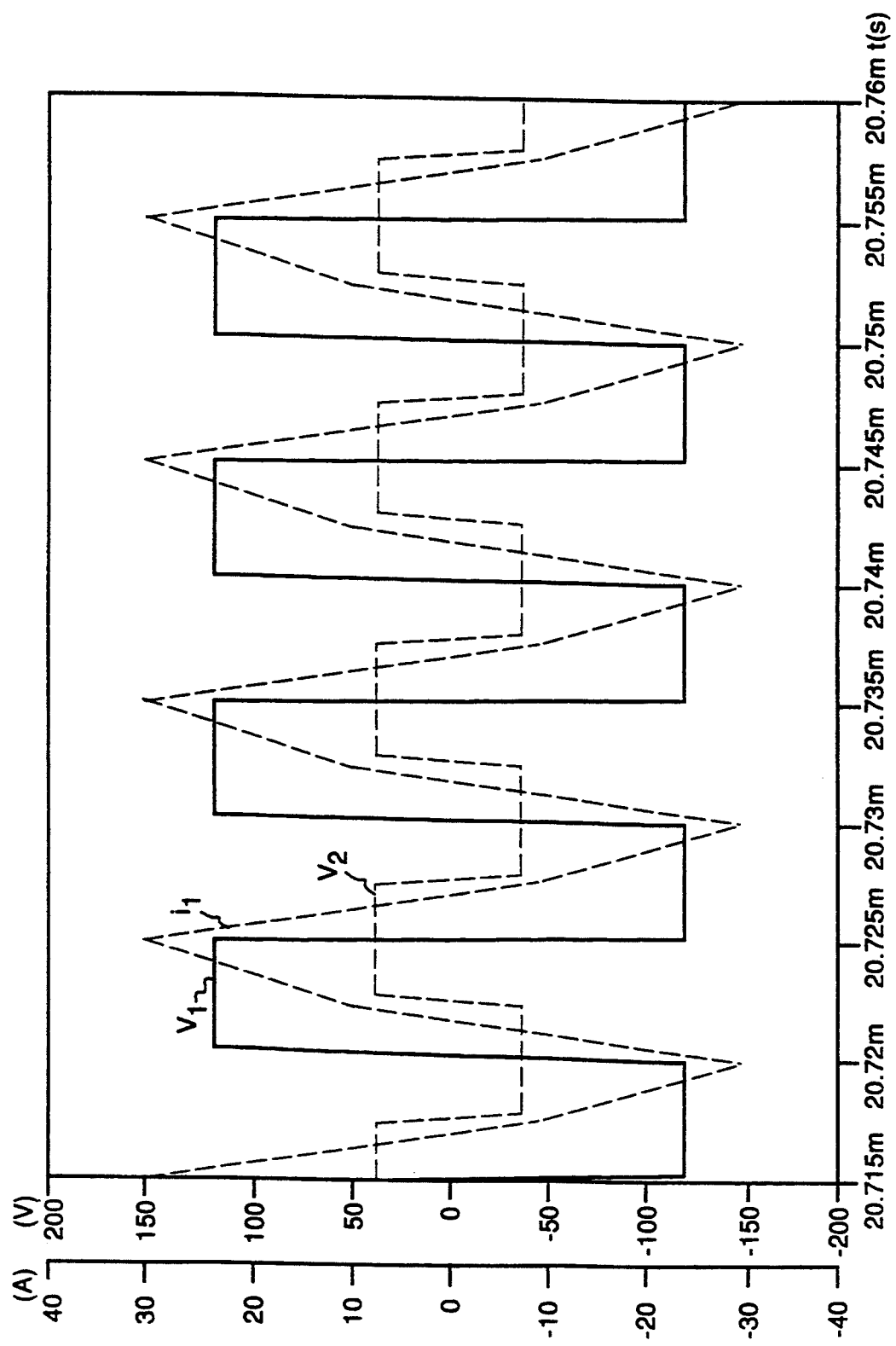
FIG. 5 graphically illustrates the high-frequency dual active bridge transformer ac current waveform $i_1$ and primary and secondary voltage waveforms $V_1$ and $V_2$, respectively, for a circuit implemented as in FIG. 1.
Figure 6:
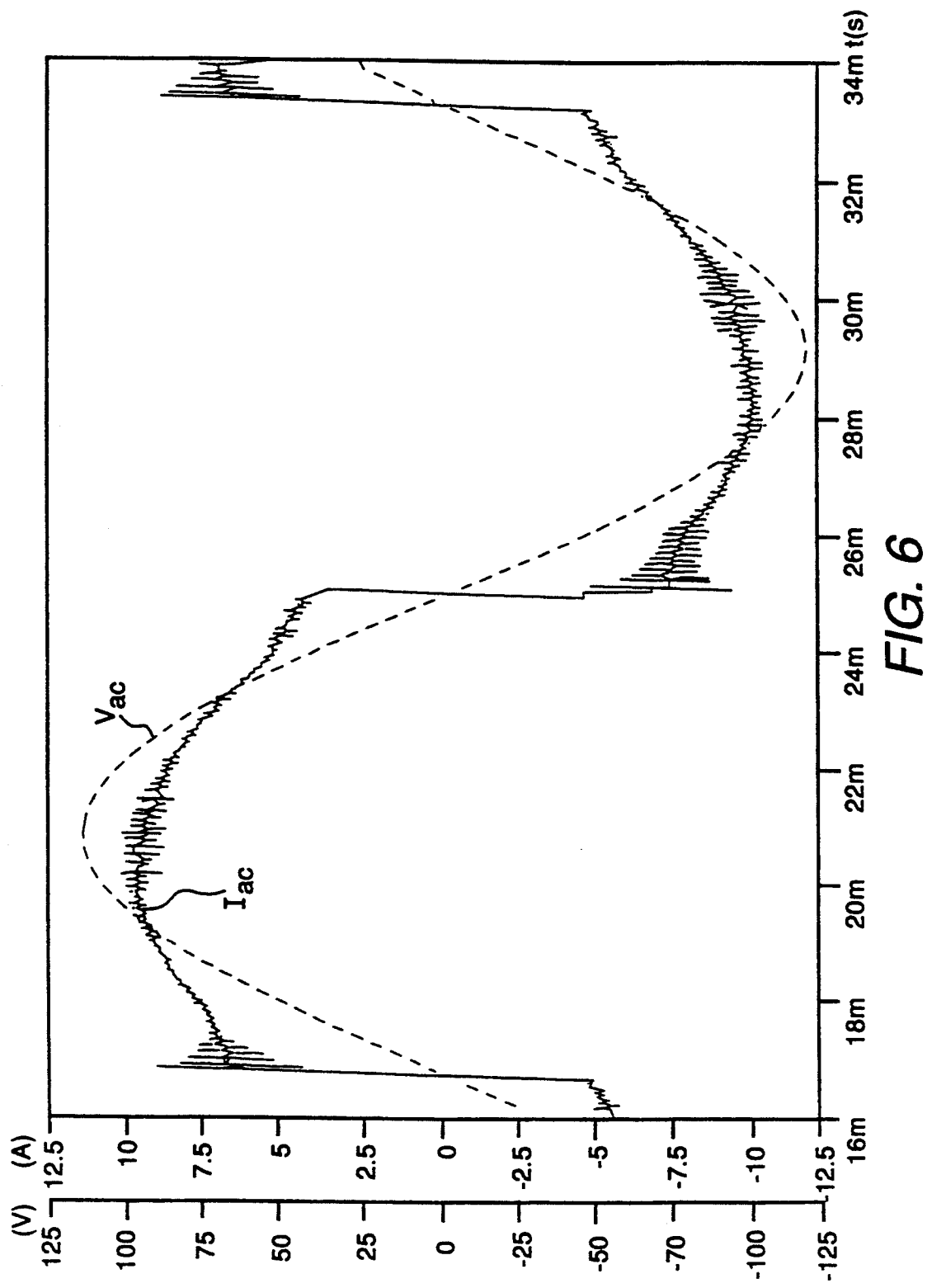
FIG. 6 graphically illustrates the input ac current waveform for a dual active bridge converter, such as that of FIG. 1, controlled in accordance with the present invention.

FIG. 5 illustrates the input current waveform $i_1$ and primary and secondary voltage waveforms $V_1$ and $V_2$, respectively, for a circuit implemented as in FIG. 1. FIG. 6 illustrates the input ac current waveform for a dual active bridge converter, such as that of FIG. 1, controlled in accordance with the present invention.

Advantageously, by using phase shift control block 50 to operate in accordance with the present invention, as described hereinabove, filter capacitor $C_{in}$ is made very small, and rectifier 10 acts in a resistive mode. Hence, not only is unity power factor operation achieved, but also high efficiency using a high density circuit with a minimum of additional devices.

While the preferred embodiments of the present invention have been shown and described herein, it will be obvious that such embodiments are provided by way of example only. Numerous variations, changes and substitutions, such as, for example, a single bridge topology or series and parallel combinations of the converter bridges, will occur to those of skill in the art without departing from the invention herein. Accordingly, it is intended that the invention be limited only by the spirit and scope of the appended claims.

What is claimed is:

1. A method for controlling a dual active bridge converter with an input ac line rectifier to operate at unity power factor, said dual active bridge converter comprising an input converter transformer-coupled to an output converter, said input and output converters each comprising a plurality of switching devices arranged in a bridge configuration, said method comprising the steps of:

said input ac line rectifier rectifying an ac line voltage;

filtering said rectified ac line voltage to provide a high-frequency filtered input dc voltage pulsating at twice the ac line frequency;

said input converter converting said high-frequency filtered input dc voltage to a high-frequency ac voltage;

transforming said high-frequency ac voltage via the transformer coupling between said input and output converters to provide a transformed high-frequency ac voltage to said output converter, said output converter converting said high-frequency ac voltage to a dc output voltage; and controlling the switching devices of said input and output converters so as to control a phase difference between said high-frequency ac voltage and said transformed high-frequency ac voltage in order to regulate said dc output voltage while providing unity power factor, said dual active bridge converter being controlled according to the expression:

$$\phi \left[ 1 - \frac{\phi}{\pi} \right] = \frac{I_p X_L}{V_{OUT}} \sin\omega t,$$

where f represents said phase difference, $I_p$ represents peak ac output current from said input converter, $X_L$ represents a leakage reactance of said transformer coupling, $V_{out}$ represents said dc output voltage, $\omega$ represents ac line frequency in radians per second, and t represents time.

2. The method of claim 1 wherein said input rectifier comprises a diode rectifier bridge.

3. A dual active bridge converter system, comprising:

an input rectifier for receiving an ac line voltage and rectifying said ac line voltage;

a high-frequency capacitor coupled across said input rectifier for filtering the rectified ac line voltage and providing a high-frequency filtered input dc voltage pulsating at twice the ac line frequency;

an input converter comprising a plurality of switching devices arranged in a bridge configuration for converting said high-frequency filtered input dc voltage to a high-frequency ac voltage;

transformer coupling means for coupling said input converter to an output converter, said transformer coupling means including a primary winding for receiving said high-frequency ac voltage and a secondary winding for providing a transformed high-frequency ac voltage to said output converter, said output converter comprising a plurality of switching devices arranged in a bridge configuration for converting said high-frequency ac voltage to a dc output voltage; and control means for controlling the switching devices of said input and output converters so as to control a phase difference between said high-frequency ac voltage and said transformed high-frequency ac voltage in order to regulate said dc output voltage while providing unity power factor, said control means operating according to the expression:

$$\phi \left[ 1 - \frac{\phi}{\pi} \right] = \frac{I_p X_L}{V_{out}} \sin\omega t$$

where f represents said phase difference, $I_p$ represents peak ac output current from said input converter, $X_L$ represents a leakage reactance of said transformer coupling means, $V_{out}$ represents said dc output voltage, $\omega$ represents ac line frequency in radians per second, and t represents time.

4. The dual active bridge converter of claim 3 wherein said input rectifier comprises a diode rectifier bridge.

* * * * *